Patented Sept. 21, 1926.

1,600,925

UNITED STATES PATENT OFFICE.

MACDONALD C. BOOZE, OF WORCESTER, MASSACHUSETTS, ASSIGNOR TO NORTON COMPANY, OF WORCESTER, MASSACHUSETTS, A CORPORATION OF MASSACHUSETTS.

CERAMIC SAFETY TILE.

No Drawing.   Application filed October 27, 1922. Serial No. 597,388.

This invention relates to safety treads and more particularly to anti-slipping tiles of ceramic bonded granular material, and the prime object of this invention is to provide a tile which may be inexpensively manufactured of readily available vitrified ceramic materials, which may have the anti-slipping grains and the bond colored either alike or differently, and which will be satisfactory for use as a stair tread and prevent slipping thereon.

In accordance with my invention, I propose to utilize as a non-slipping granular material a grit of porcelanic composition, and to bond such grit with a vitrified ceramic bond and form a porous tile in which both the anti-slipping grains and the bond are of ceramic composition. I find that a satisfactory anti-slipping material may be made by crushing to proper grit size discarded porcelanic tiles produced for flooring. Of the available materials, I preferably utilize a vitrified porcelain body which has a minimum of porosity and is very dense and has substantially the hardness of quartz. A porcelain which has been burned to a somewhat glassy condition is particularly satisfactory for my purposes. As an illustration of one available tile composition, I may utilize clay, flint and feldspar within the following proportions:

| | Per cent by weight. |
|---|---|
| Ball clay | 30 |
| Flint | 10 |
| Feldspar | 60 |

This material is mixed to a dry press consistency, pressed in a suitable shape and burned to approximately seger cone 10, forming a very dense, opaque, well vitrified body.

This anti-slipping material is crushed to suitable grit size of sharp, angular and irregular shape which will render it anti-slipping to footgear. It works best if sized so as to pass through a screen between 20 to 100 meshes to the linear inch. I ordinarily employ the coarser range of grains since too much of the fine material is equivalent to using more bond mixture and lowering the porosity of the final product.

In order to bond this granular material into a porous, anti-slipping tile, I utilize a vitrifiable ceramic bond which may be of either the porcelanic or vitreous type. If a porcelanic bond is employed, I ordinarily employ not under 25% and not over 60% by weight relative to the total amount of bond and anti-slipping grains, in order that the porosity may be within desired limits. As an illustration of a suitable porcelanic bond, I may employ the following ingredients in the proportions specified:

| | Per cent by weight. |
|---|---|
| Ball clay | 30 |
| Feldspar | 50 |
| Flint | 20 |

It is to be noted that such a bond is preferably over-fired so that it is capable of uniting with the anti-slipping grains to a considerable extent by entering into solution with the surface material of the grain. The above bond composition may be fired at seger cone 12.

Where the higher degrees of porosity are desired, I preferably employ a bond which is capable of being fired to a completely vitreous or glassy condition under such firing conditions as will not materially soften or detrimentally affect the porcelanic anti-slipping grains. As a specific example, I may utilize from 15% to 40% of a glassy bond of the following ingredients and proportions:

| | Per cent. |
|---|---|
| Ball clay | 20 |
| Feldspar | 45 |
| Slip clay | 35 |

This vitreous bond, being fluid at the temperature of burning, which may correspond to seger cone 12, is capable of flowing into intimate contact with the grains and producing by solution and chemical reaction a strong union therewith. By using this highly fluid material, I may increase the porosity of the tile to a maximum and make a tougher, stronger and more wear-resistant body than one in which a porcelanic bond is used.

The tile porosity, which I ordinarily prefer to be between 10% and 40% of the volume as measured by the penetration of water, determines to a considerable extent the anti-slipping qualities of the tile. The porosity is determined by the amount of bond, by the proportions of various grain sizes used and by the pressure used in pressing the tile. If the porosity is too low then the anti-slipping grains lose their individuality and do not protrude a sufficient distance from the surface of the tile to offer great resistance to slipping. When the porosity is high the wear is taken by a relatively small number of grains and such a tile may consequently be short lived. A tile of high porosity is also objectionable from the standpoint of cleanliness since it can take up and hold a relatively large amount of dirt.

This tile is made in accordance with well known ceramic practice, the main precaution being to fire the article under such a heat treatment that the porcelanic grains will not be materially softened and yet the bond and the grains will unite integrally. Hence the bond mixture must be selected relative to the composition and physical characteristics of the grains so that a minimum of bond may be used to produce an integral, non-homogeneous structure of the desired degree of strength and durability as well as porosity. This bond may have the same or a lesser degree of durability and toughness as compared with the anti-slipping abrasive grains. The mixture of grains and bond may be formed to the desired shapes by the usual methods of casting or pressing, the grains and bond being mixed with a desired amount of water and thereafter shaping an article therefrom and burning in a ceramic kiln.

The grains or bond or both may be colored by the addition of such metallic oxides as are commonly used in the art for the production of ceramic colors. As an example, I may add to the porcelanic bond 3% by weight of green oxide of chromium, form an article of the desired shape from a mixture of this bond and anti-slipping grains, and fire the article in a ceramic kiln to a temperature corresponding to cone 12, preferably in an oxidizing atmosphere. The bond in an article made by this method will be colored green. The anti-slipping grains will retain their individual colors and by a suitable choice of coloring material for the bond, an article may be made of uniform color or variegated. I do not limit myself to any color or mixture of colors.

I claim:

1. A safety tile comprising durable, wear-resistant, anti-slipping grains of porcelain bonded into an integral non-homogeneous, highly porous mass by a vitrified ceramic bond of a nature softer than the grains.

2. A safety tile comprising anti-slipping abrasive grains of hard and tough porcelain and a bond of vitrified ceramic material united into an integral highly porous mass, said bond forming between 25 and 60% by weight of the total mass and being more vitreous at the temperature of firing than the grains.

3. A safety tile comprising anti-slipping abrasive grains of crushed porcelain coarser than 100 meshes to the linear inch and a bond of vitreous ceramic material which incompletely fills the voids between the grains and is inter-dissolved with the surface material of the grains, said tile having a porosity of at least 10%.

4. A safety tile comprising coarse abrasive grains of dense and hard porcelain, coloring material and from 15 to 40% by weight of a vitreous ceramic bond united into an integral colored mass, having a rough anti-slipping surface and a porosity of at least 10%, said tile having been so fired as to cause the bond and grains to unite without detrimentally softening the grains.

Signed at Worcester, Massachusetts, this 26th day of Oct. 1922.

MACDONALD C. BOOZE.